Feb. 17, 1959 H. W. SIMPSON 2,873,621
PLANETARY TRANSMISSION FOR SELF-PROPELLED VEHICLES
Filed Jan. 17, 1955 6 Sheets-Sheet 3

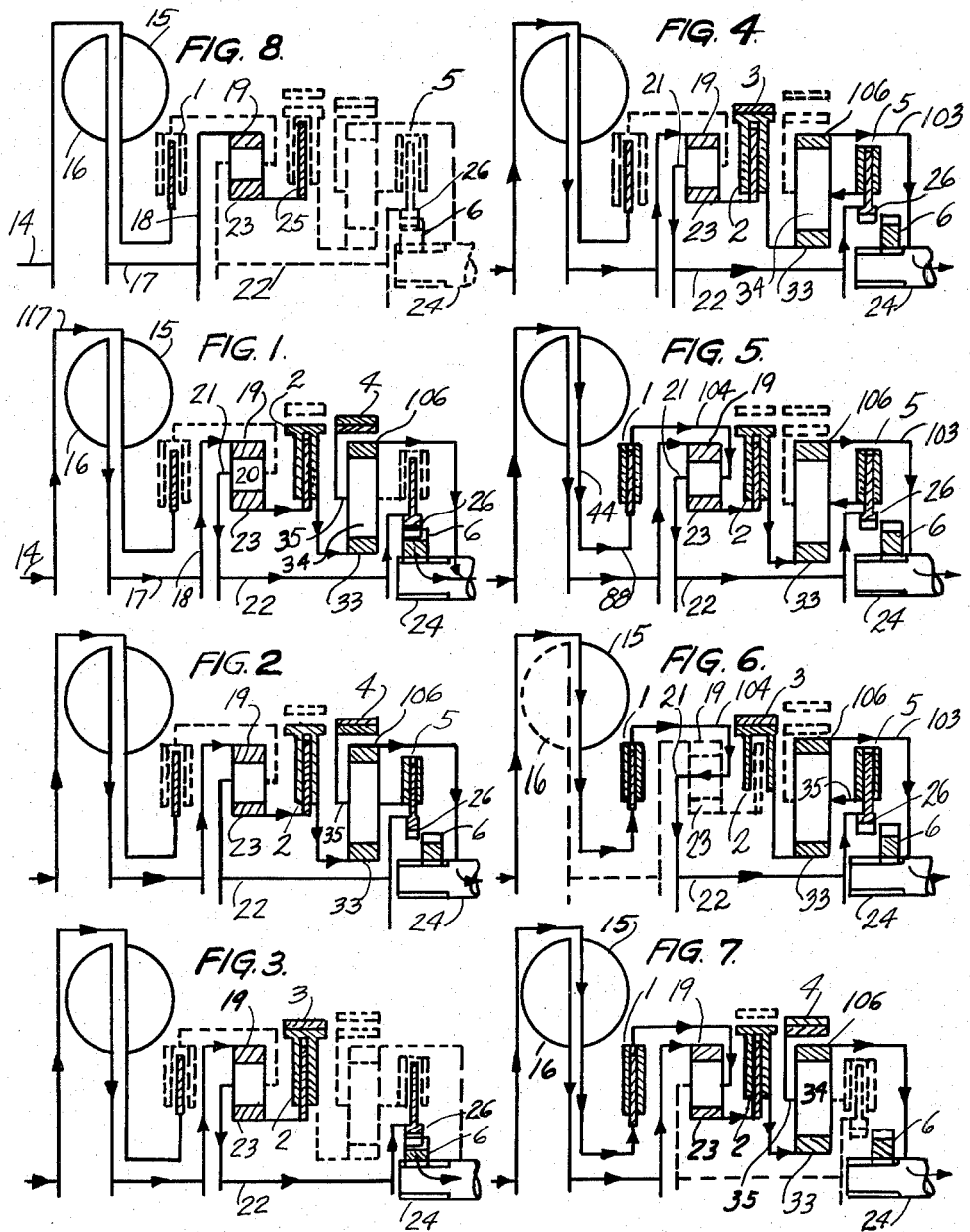

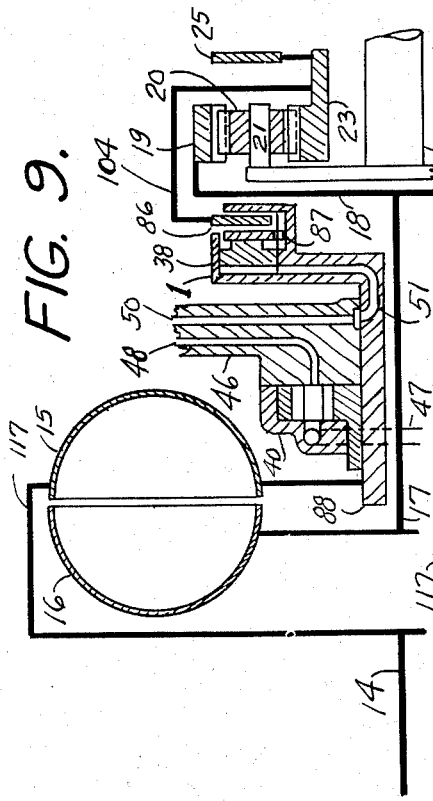

INVENTOR.
HOWARD W. SIMPSON.
BY
ATTORNEY.

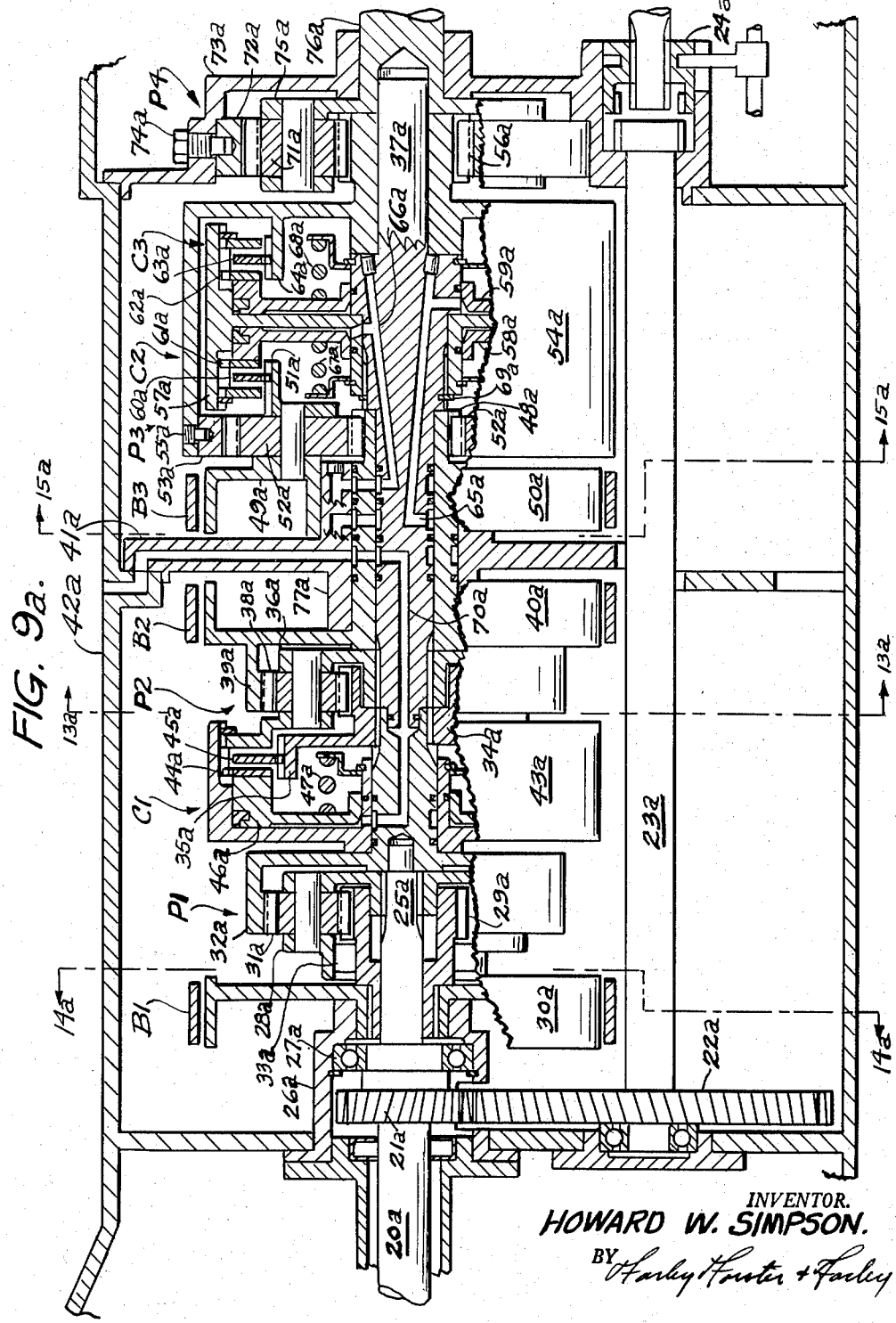

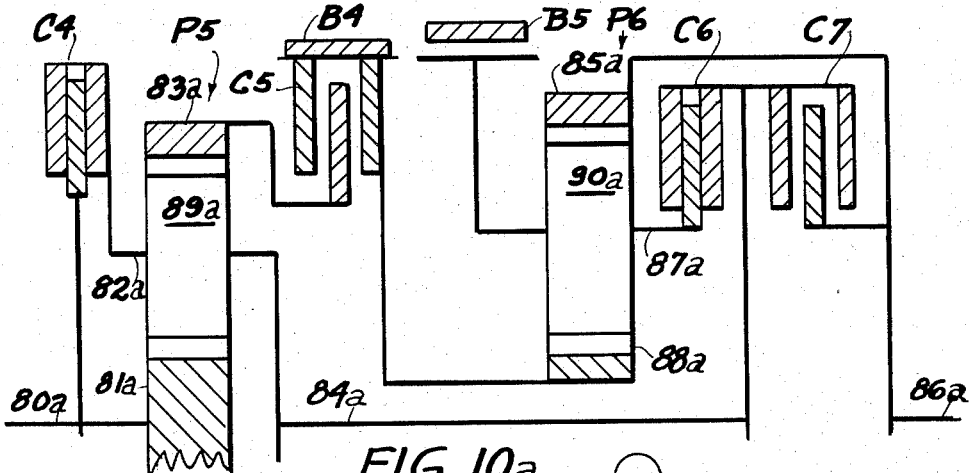
FIG. 10a.
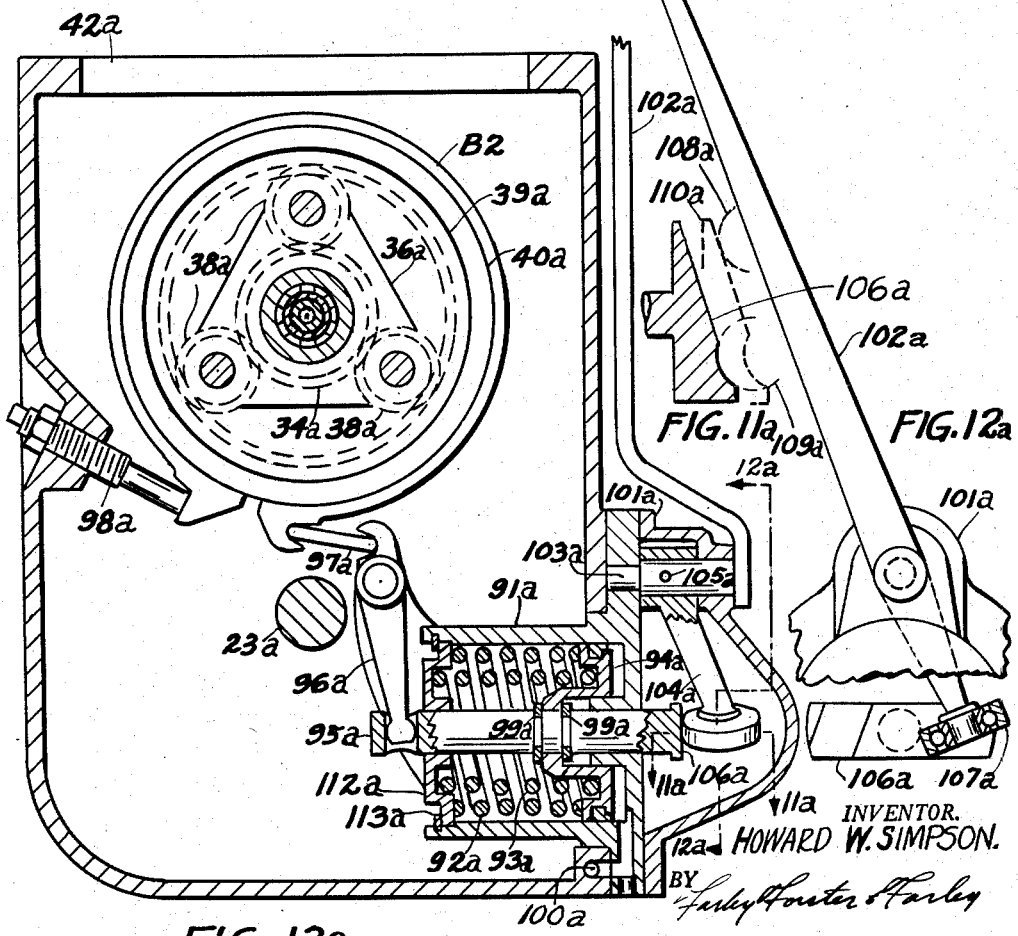
FIG. 13a.
FIG. 11a.
FIG. 12a.
INVENTOR.
HOWARD W. SIMPSON.

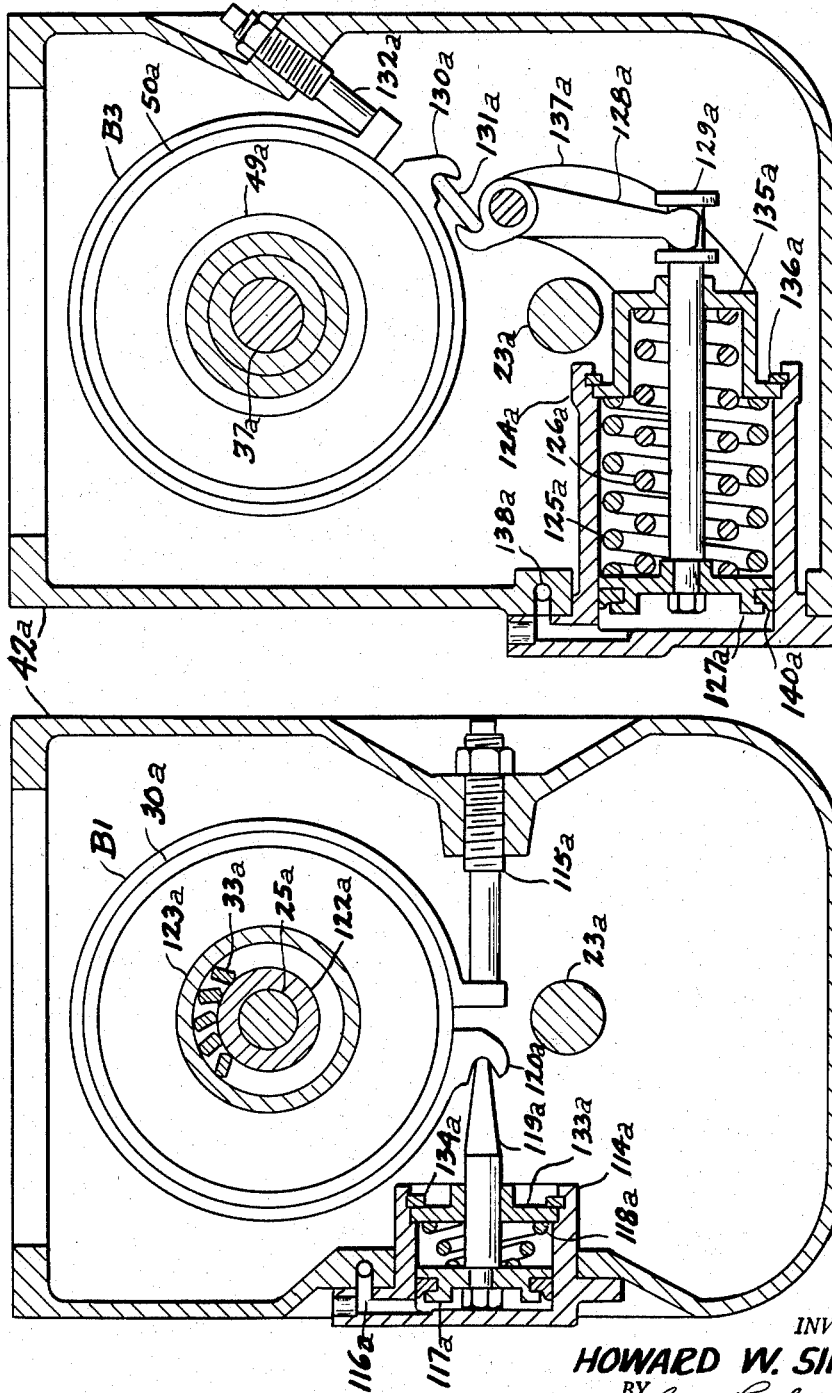

United States Patent Office 2,873,621
Patented Feb. 17, 1959

2,873,621

PLANETARY TRANSMISSION FOR SELF-PROPELLED VEHICLES

Howard W. Simpson, Dearborn, Mich.

Application January 17, 1955, Serial No. 482,102

32 Claims. (Cl. 74—677)

This invention relates to a fluid pressure actuated planetary gear transmission and more particularly to a transmission employing coaxial sets of simple planetary gearing and forms a continuation-in-part superseding my copending United States patent application Serial No. 115,330, abandoned by the filing of the present application, which copending application superseded my prior United States patent application Serial No. 60,565.

The present application adds to the disclosure of the last preceding application principally a modification of the coaxial sets of planetary gearing shown therein adapting them for use in tractor and truck transmissions requiring as many as ten or more speeds.

My prior application Serial No. 115,330 disclosed a combined double planetary gear set basically the same as that disclosed in my earlier application Serial No. 60,565, but including a number of modifications such as the disclosure of an additional forward reduction ratio by applying certain of the previously disclosed friction elements in a new combination, the disclosure of a different method of by-passing the fluid coupling during final drive ratios, the elimination of roller clutches and the elimination of an hydraulic control system which forms no part of the present invention.

Certain of today's commercial automatic transmissions employing two planetary gear sets in obtaining four forward speeds are subject to a number of limitations which the present construction is directed to overcome.

Specifically, it is an object of the present invention to adapt two simple coaxial planetary sets, each comprising ring, sun, planet and carrier elements, to provide a greater number of forward speed ratios than have heretofore been available, including up to as high a number as six progressive forward speeds.

Another object is to obtain a reverse reduction drive within the planetary sets alone eliminating the necessity for an extra gear set for such purpose.

Another object is to obtain an overdrive ratio with the two planetary sets.

Another object is to connect the individual planetary sets in differential arrangement for a low speed forward drive to permit a parallel delivery from the output elements of each planetary set and thereby avoid the high loading of the working gears of the second planetary set which results from compounding reduction ratios in series.

Another object is to employ a reverse overdrive ratio of one planetary set in series with a reverse reduction ratio of a second set in order to obtain a net forward reduction ratio.

Another object is to combine a forward reduction ratio of one planetary set in series with a forward overdrive ratio of a second set in order to obtain a net forward reduction ratio.

Another object is to combine a locked up planetary set in series with a forward overdrive ratio of a second set in order to obtain a forward overdrive ratio.

Another object is to combine a locked up planetary set in series with a reverse reduction ratio in order to obtain a reverse reduction ratio without resorting to outside gearing.

Another object is to obtain four progressive forward reduction ratios by combining two planetary sets respectively in differential relationship, in series reverse overdrive to reverse reduction relationship, in single forward reduction direct to output relationship, and in series forward reduction to forward overdrive relationship.

Another object is to obtain forward overdrive and reverse reduction ratios with the same planetary sets by utilizing corresponding ratios of individual sets.

Another object is to minimize requirements for the engagement of high multiplied torque under load by friction elements.

Another object is to employ a fluid coupling operative only in relatively low speed ratios with clutch mechanism adapted to take drive from the input element of the fluid coupling during final drive.

Another object is to reduce power losses due to the idling of non-working gears.

Another object is to provide a transmission which may be shifted with either manual or automatic controls within a compact unit having balanced shaft loads permitting the use of relatively inexpensive bearings.

Another object is to provide a modification of the planetary gear sets specifically adapted to heavy duty tractor and truck operation requiring as many as ten or more speeds.

Another object is to provide means for obtaining large over-all reduction ratios suitable for use in tractor and other heavy duty applications while retaining low torque loading on the friction elements involved in shifting ratios.

Another object is to provide means for utilizing the transmission as an automatic parking brake upon stopping the engine.

Another object is to provide means for pushing or towing the vehicle with the engine off when required.

Another object is to provide two reverse underdrive planetary sets in series to obtain a net forward reduction ratio.

Another object is to provide a power take-off which is independent of the transmission thereby permitting gear changing without stopping the power take-off.

In general, I have accomplished these objects in providing a five or six speed transmission in accordance with my prior applications by connecting two planetary sets differentially for obtaining low forward speed drive, in series reverse overdrive to reverse reduction relationship for obtaining a second forward reduction drive, in single forward reduction direct to output relationship for obtaining a third forward reduction drive, in series forward reduction to forward overdrive relationship for obtaining a fourth forward reduction drive, in series locked-up relationship for obtaining a fifth forward speed direct drive, in series locked-up to overdrive relationship for obtaining a sixth forward speed overdrive, and in series locked-up to reverse reduction relationship obtaining a reverse reduction drive.

A fluid coupling is adapted to deliver all power from its output element in the first four speeds while part of the power is taken directly from the input member in fifth speed direct drive and all of the power is taken from such input member in overdrive thereby avoiding any power loss through slippage in the coupling in the final drive.

In order to avoid loss of power from idling gears, the gear sets are adapted to be working or to be locked in conjoint rotation in all speeds except third in which speed one set of planetary gears idle slowly.

Selectively engageable coupling elements employed include three friction clutches between the fluid coupling input and first carrier, the two sun gears, and the two carriers, respectively; a jaw clutch between the first carrier and output shaft; and two friction brakes for holding stationary the second sun gear and second carrier, respectively.

Relative to the heavy duty modification, I employ a variation of the planetary gear sets of my prior applications to obtain five speeds forward and one reverse, the five speeds being varied in such a way as to allow the use of an auxiliary overdrive gear set between the engine and the five speed unit. This not only provides five additional speeds, but widens the over-all range all the way from a creeper gear for the slowest field operations in the case of tractor use to a fast road gear for movement under conditions of little or no load. An optional fixed reduction gear is also provided between the ten speed unit and the rear axle drive unit for use in tractors which do not have a large reduction ratio in their final or axle drive.

By employing an overdrive unit ahead of the five speed unit to provide two ranges of operation together with a high fixed reduction ratio behind the five speed unit, and avoid high torque loading for the frictional elements employed in shifting and reduce the diametral and axial dimensions of such elements required for a given power capacity.

The auxiliary overdrive gear consists of a simple planetary set with a brake for holding its sun gear for a reaction and a one-way clutch for locking the gear train in direct drive.

In conventional tractor practice, it is necessary to set the rear wheel brakes to hold the vehicle on a slope when the transmission is in neutral but in this disclosure the transmission reaction brakes are used to hold the vehicle. In order to accomplish this, one member of the planetary case sets is connected to the output shaft and the other two members of this set are selectively held by spring applied brakes. Thus, when both brakes are engaged the output shaft and the drive wheels are held stationary.

These brakes may be applied when the engine is running by controls releasing the fluid pressure admitted thereto and are automatically applied when the engine is stopped with loss of oil pressure.

In order to push or tow the tractor when the engine is stopped, provision is made for a manual release of one of the brakes.

Although the tractor wheels are held by the brakes when in parking, the input shaft of the transmission is free to turn. Thus, the engine can be started without releasing the parking lock.

Vehicle creep commonly occurs with transmissions having disk clutches but creep is prevented in the present transmission by allowing the creep torque to act upon the transmission housing through the above-mentioned reaction brakes instead of on the transmission output member.

In the drawings, Figs. 1 to 6 are diagrammatic sectional views of the main elements in 1st, 2nd, 3rd, 4th, 5th and 6th speeds respectively, while Fig. 7 shows reverse and Fig. 8 neutral, the arrows showing the path of power, the loaded or working members being shown in solid lines, and the nonworking parts in dotted lines.

Fig. 9 is a partial sectional view showng one method of connecting the engine directly to the gearing through a clutch.

Fig. 10 is a diagrammatic vertical section of the transmission showing the fluid coupling, hydraulically operated brakes and clutches, and oil pumps with all clutches and brakes disengaged and including a different method of connecting the engine directly to the gearing.

Fig. 11 is a partial view of clutch teeth 6a and 26 showing beveled construction.

Figs. 1a to 6a are diagrammatic sectional views showing how five speeds forward and one in reverse are obtained in the presently added modification adapted for use in heavy duty tractor or truck transmissions.

Fig. 9a is a simplified partial elevation in section of the complete modified transmission including a power take-off drive and power take-off clutch.

Fig. 10a is a diagrammatic sectional view similar to Figs. 1a to 8a but with an additional clutch by which a sixth speed is obtained.

Fig. 11a is a section taken along the line 11a—11a of Fig. 13a.

Fig. 12a is a fragmentary side elevation in partial section along the line 12a—12a of Fig. 13a.

Fig. 13a is a transverse sectional view along the line 13a—13a of Fig. 9a showing the servo unit for engaging and releasing the middle transmission brake and the lever for manual release to obtain neutral with a dead engine.

Fig. 14a is a transverse sectional view along the line 14a—14a of Fig. 9a showing the servo for operating the front brake.

Fig. 15a is a transverse sectional view along the line 15a—15a of Fig. 9a showing the servo for operating the rear brake.

Figure 8A:
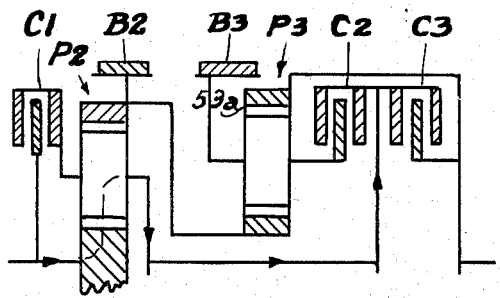
Fig. 8a shows the position of the brake bands in parking.

In Fig. 10, input shaft 14 is connected to fluid coupling impeller 15. Runner 16 transmits torque to shaft 17 and through flange 18 to planetary ring gear 19 of the first planetary gear set. Planet gear 20 is one of three mounted in the same plane on carrier 21. Sun gear 23 is the other member of the first planetary set and is connected to clutch disk 25. The second planetary set consists of sun gear 33, ring gear 106 and three planet gears 34, one of which is shown mounted on carrier 35. Planet carrier 21 is integral with shaft 22, clutch housing 5a, and clutch teeth 26. Carrier 35 is integral with clutch disk 29 and brake drum 119, and is freely rotatable on sun gear 33. A direct drive from input shaft 14 to shaft 22 is obtained through impeller 15, flange 44, sleeve 88, and clutch housing 1a as explained hereinafter.

Clutch housing 1a is integral with sleeve 88 and contains piston 38, sliding drive disk 87 and driven disk 86 which is connected to carrier 21 by drum 104. Piston 38 is energized by oil pressure through passage 50 in housing 46 and passage 51 in rotating sleeve 88. Disks 86 and 87 are slidable endwise in order to release and engage, although only disk 87 is shown as splined.

Likewise, disks 25 and 91 in clutch 2 and disks 28 and 29 in clutch 5 are slidable endwise of the members on which they are mounted. Clutch 2 is engaged by oil pressure through passage 58 in housing 46 and through passage 59 in the rotatable hub of sun gear 33 which is integral with clutch housing 2a. It contains piston 39 and drive and driven disks 25 and 91, respectively.

Brake band 3 clamps the outside periphery of clutch housing 2a by means of piston 108 in cylinder 53 when the piston is energized by oil pressure through passage 56. The mounting of cylinders 53 and 54 is omitted and also the linkage connecting the pistons 108 and 36 to brake bands 3 and 4, the latter being adapted to hold carrier 35, as the specific construction of these elements is not part of the present invention and is structure that is well known. Likewise the valves, pressure regulating devices and manual controls are omitted, since any suitable controls of either manual or automatic type may be adapted to actuate the fluid pressure operated elements.

Clutch 5 contains drive and driven disks 28 and 29 and piston 27 which is energized by oil pressure through passage 61 in shaft 22 which communicates with passage 60 in housing 46.

Ring gear 106 is connected to hydraulic cylinder 102 which is integral with output shaft 24.

Clutch member 6a is a sliding toothed member splined to shaft 24. A light spring 32 tends to engage it with internal teeth 26 but a heavy spring 37 urges clutch member 6a out of engagement with teeth 26 when it is energized by hydraulic piston 89 in cylinder 102 by oil pressure through passage 63 in output shaft 24 and passage 62 in housing 46.

Oil pumps

A front oil pump consists of gear 43 keyed to sleeve 88 which rotates with the engine crankshaft at all times. It drives internal pump gear 45 mounted in the housing 46. Oil from the sump, not shown, is drawn up to the pump through tube 47 and oil under pressure is forced through passage 48 to suitable controls for operating the various brakes and clutches.

A rear oil pump is contained in housing 10 consisting of internal driven oil pump 11 meshing with drive gear 13 keyed to output shaft 24. This pump provides pressure when the vehicle is moving although the engine be stationary. It draws oil from the sump through inlet passage 41 and delivers oil under pressure through a passage, not shown, to the same control means as supplied by the front pump through passage 48. Suitable check valves, not shown, may be used to prevent either pump from discharging through the other when either pump is stationary or turning too slowly to develop adequate pressure.

Operation

Referring to Fig. 9, clutch disk 86 is connected to sun 23 by drum 104 whereas in Fig. 10, disk 86 is connected to carrier 21.

Referring to Fig. 10, all friction clutches and brakes may be released when the engine is stopped, but brake 4 should engage as soon as the engine starts and oil pressure is developed as shown in Fig. 8. On the other hand, toothed clutch members 6a and 26 are engaged when the engine is stopped, and when the engine is started these remain engaged in neutral and first speed drives. In neutral, ring gear 19 turns with runner 16 by means of shaft 17 and flange 18. Since shaft 22 is connected to the output shaft 24 by clutch 26, 6a it remains stationary, and so sun gear 23 and disk 25 are forced to turn backward. Shifting consecutively from low up through the various speeds to high will now be described.

A shift from neutral to low speed is obtained by engaging clutch 2 connecting sun gears 23 and 33 as shown in Fig. 1. If the engine is idling there is no drive until the engine is speeded up to obtain a drive through the fluid. Clutch 2 transmits a load of only about 62% of engine torque, using recommended gear sizes hereafter described, and connects the two sets of gears in differential relationship so as to obtain a parallel path of power through the gears. When clutch 2 is engaged it turns sun 33 backward and carrier 35 tends to turn backwards also but is restrained by brake 4 which must hold a reverse torque of about 2.9 times engine torque but which is already engaged when the load is applied. Power is transmitted from shaft 14 through drum 117, impeller 15, runner 16, shaft 17, flange 18, ring gear 19, planet 20 to carrier 21, and therefrom along parallel paths, one through shaft 22 and clutch 6a, 26 to output shaft 24, and the other through suns 23 and 33, pinions 34 and ring 106 to output shaft 24.

If $r$ and $s$ are the number of teeth in the first ring gear 19 and first sun gear 23, the torque multiplication of the first set is $r+s \div r$. If $R$ and $S$ are the number of teeth of the second ring and sun gears 106 and 33, the torque multiplication at this set has a value of $R \div S$. But since the second set has an input torque on sun gear 33 in proportion to the ratio of the first sun gear 23 to the first ring gear 19, the true torque multiplication produced at the second set in relation to engine torque is $$\frac{R}{S} \times \frac{s}{r}$$

The total low speed torque multiplication is the sum of those obtained in each gear set and is $$\frac{r+s}{r} + \left(\frac{R}{S} \times \frac{s}{r}\right)$$

In second speed, clutch 2 and brake 4 remain engaged as in low but clutch 6a, 26 releases and clutch 5 engages as shown in Fig. 2. Brake 4 now holds both carriers 21 and 35 stationary. Sun 23 is driven backward at a reverse overdrive ratio which carries sun 33 backward with it thus driving ring gear 106 forward through reduction gearing of the second planetary set. Since the second sun 33 is much smaller than the first sun 23, the ring 106 and output shaft 24 will run at an over-all reduction speed.

The reverse overdrive at the first set is $r \div s$ and the reverse reduction at the second set is $S \div R$. The total reduction in second speed is $(s \div r) \times (R \div S)$.

In third speed shown in Fig. 3, clutch 5 is released, clutch 6a, 26 re-engaged and brake 3 is engaged in place of brake 4. Output torque is entirely from the first set of gears as sun gear 23 is the reaction member and the entire output torque is transmitted to carrier 21. The second set of gears idles forward but transmits no torque. The reduction in 3rd is $(r+s) \div r$.

In fourth speed brake 3 remains engaged as in third but clutch 5 is re-engaged and clutch 6a, 26 is released. This again gives a series connection through both sets, as in second speed, but with both sun gears now being reaction members instead of both carriers. As shown in Fig. 4, torque multiplied in the first set is transmitted from carrier 21 through shaft 22, clutch 5, carrier 35, planets 34, ring gear 106, drum 103 to output shaft 24. The front set is in underdrive and the rear set in overdrive but the net compound reduction, as in second speed, is an underdrive gear reduction. The total gear reduction is $$\frac{r+s}{r} \times \frac{R}{R+S}$$

Fifth speed, as shown in Fig. 5, is a direct drive effected by releasing brake 3 (shown applied in Fig. 4) and applying clutch 1. Part of the engine torque is transmitted to ring gear 19 through the fluid coupling runner as in lower speeds but the major portion is transmitted to the carrier 21 from the impeller 15 through flange 44, sleeve 88, clutch 1 and drum 104 to carrier 21. Since there is less torque being transmitted through the fluid coupling than in other speeds, the slip is reduced but since some fluid slip remains there is a slight relative motion in the gearing although for practical purposes the transmission may be considered as substantially locked in direct drive. Clutches 2 and 5 remain engaged which locks the second set of gears also in the same way as the first set, i. e., with a very slight relative motion. As in low speed, there is now a parallel path of torque through the gearing to the ring gear 106, but in this case without appreciable gear reduction, and ring gear 106 transmits all of the power through drum 103 to output shaft 24.

A direct drive entirely through the fluid coupling may be obtained without engaging clutch 1 if the partial lock-up of the fluid coupling described above is not desired.

In sixth speed, clutch 2 releases, thus freeing sun gear 33 from torque load. Brake 3 is then applied to hold sun 33 as a reaction member. Since sun 23 is not connected to any other member no power can be transmitted through it from ring gear 19 with which it meshes. Consequently, runner 16 only absorbs enough power from impeller 15 to overcome fluid friction while it idles at approximately the same speed as the latter. The engine torque is therefore transmitted as shown in Fig. 6 directly from the impeller 15 through clutch 1, drum 104, carrier 21, shaft 22 and clutch 5 to carrier 35 which is free to rotate on the hub of sun gear 33, the latter being held stationary by brake 3. Planetary gear action rotates ring gear 106 forward faster than the speed of carrier 35. This overdrive speed is transmitted through drum 103 to output shaft 24. The overdrive ratio in sixth speed is $R \div (R+S)$.

Reverse is obtained by engaging clutches 1 and 2 and brake 4, with clutch 5 and brake 3 released. It is intended that a manual shift lever will be moved to neutral, as shown in Fig. 8, before or while shifting to reverse which will engage brake 4 as shown in Fig. 7. Consequently, when completing the shift from neutral to reverse, load can only be applied to brake 4 after clutches 1 and 2 have engaged. Therefore, all the slippage takes place on these two clutches which are lightly loaded instead of on reaction brake 4 which is heavily loaded. Torque is applied to the first set of gears from both the runner 16 and directly from the engine through clutch 1 as in 5th speed. This drives the first planetary set and sun 33 which is locked to the front set by clutch 2 at substantially engine speed. Carrier 35, being the reaction member, causes the planet pinions 34 to act as idlers, and ring 106 is turned backward at reduced speed. The reverse reduction is $R \div S$.

The action of clutch teeth 6a and 26 is such that these members release and clutch 5 engages or vice versa without interruption of power output. When shifting from first to second and from third to fourth speed, piston 27 in clutch 5 and piston 89 shown in Fig. 10 are energized simultaneously. When clutch 5 begins to engage, torque is gradually applied to carrier 35 and when sufficiently engaged, it will tend to drive ring gear 106, shaft 24 and clutch teeth 6a faster than clutch teeth 26. Meanwhile, piston 89 has compressed spring 37 to urge sliding clutch teeth 6a out of engagement as soon as ring gear 106 overruns and relieves the pressure between clutch teeth 6a and 26.

On up shifts from second to third and on down shifts from fourth to third and from second to low, the reverse of above action takes place, i. e., clutch 5 is released and clutch teeth 6a and 26 engage.

In each of these latter three cases, clutch teeth 26 are stationary or rotating slower than clutch teeth 6a before clutch 5 is released. When clutch 5 is released clutch teeth 6a and 26 attempt to engage but can only ratchet under the influence of light spring 32. However, clutch teeth 26 soon speed up and engage at the moment of synchronization. The beveled ends of clutch teeth 6 and 26 shown in Fig. 11 permit this action.

The following gear reduction ratios are obtained with the following number of teeth in the ring and sun gears, $r=76$, $s=47$, $R=85$, $S=23$. Low 3.90, 2nd 2.29, 3rd 1.62, 4th 1.27, 5th 1.00, 6th .78, Rev. 3.69.

The following chart shows the percent of engine torque load carried by the clutches and brakes with the above ratios and without frictional losses being considered in the calculations.

|  | Clutch 1 | Clutch 2 | Clutch 5 | Clutch 6 | Brake 3 | Brake 4 |
|---|---|---|---|---|---|---|
| Low | | 1 62 | | 162 | | 290 |
| 2d | | 62 | 1, 2 162 | | | 2 129 |
| 3d | | 62 | | 162 | 1 62 | |
| 4th | | 62 | 1 162 | | 2 27 | |
| 5th | 1 56 | 2 27 | | 127 | | |
| 6th | 100 | | | 100 | 1 27 | |

1 Slip engagement under load on upshifts.
2 Slip engagement under load on downshifts.

The following chart shows which sets are working (W), idling (I), stationary (S) and locked together to rotate as a unit (L), in the different speeds.

|  | Neut. | Low | 2d | 3d | 4th | 5th | 6th | Rev. |
|---|---|---|---|---|---|---|---|---|
| 1st gear set | I | W | W | W | W | L | L | L |
| 2d gear set | S | W | W | I | W | L | W | W |

The foregoing operation and charts have not referred to Fig. 9, which shows clutch disk 86 connected to sun gear 23 instead of carrier 21. This does not change any gear ratios since the first set is again substantially locked up whenever clutch 1 is engaged, with only the slippage in the fluid coupling permitting slight reduction, but it does change the amount of torque transmitted through the fluid coupling in 5th, 6th and reverse speeds. The following chart is therefore added to show the percent of engine torque passing through the fluid coupling with both methods of connecting the gearing to clutch disk 86. The percentages given are for the particular ratios and numbers of teeth in the gears given above.

|  | Low | 2d | 3d | 4th | 5th | 6th | Rev. |
|---|---|---|---|---|---|---|---|
| Fig. 10 | 100 | 100 | 100 | 100 | 43 | 0 | 160 |
| Fig. 9 | 100 | 100 | 100 | 100 | 80 | 80 | 0 |

Referring now to the modifications of Figs. 1a to 15a and more specifically to the sectional elevation of Fig. 9a, the friction clutches are shown having only one driving and one driven disk although in practice multiple disks would be used. Also various fittings, washers and bushings are omitted for greater clarity. In Fig. 9a, input shaft 20a drives power take-off gears 21a and 22a and shaft 23a, the splined end of which is engageable with clutch 24a. Input shaft 20a has extension 25a and is supported in sleeve 26a by ball bearing 27a, sleeve 26a being attached to housing 42. Auxiliary overdrive gear set P1 consists of carrier 28a splined to extension 25a, sun gear 29a to which brake drum 30a is splined, planet gears 31a and ring gear 32a. One-way clutch 33a is between sun gear 29a and carrier 28a.

Sun gear 34a of gear set P2 is splined to the stub end of ring gear 32a and has clutch drum 35a integral. Carrier 36a is splined to shaft 37a and supports planet gears 38a. Ring gear 39a has brake drum 40a and sun gear 48a of gear set P3 integral and is supported inside of hub 77a of plate 41a attached to housing 42a. Carrier 36a is splined to drum 43a of clutch C1 which includes sliding plates 44a and 45a, piston 46a and retracting spring 47a. Sun gear 48a of gear set P3 supports shaft 37a in which the latter is free to rotate.

Carrier 49a is mounted on the outside of the hub 77a of plate 41a and has brake drum 50a and clutch drum 51a integral. Planet gears 52a are supported on carrier 49a and mesh with sun gear 48a and ring gear 53a which is fixed in drum 54a by screw 55a.

Shaft 37a drives dual clutches C2 and C3 which are used to connect shaft 37a with carrier 49a or sun gear 56a respectively, the latter being integral with clutch drum 64a. Clutches C2 and C3 include clutch housing 57a, sliding clutch plates 60a, 61a, 62a and 63a, and pistons 58a and 59a which are actuated by oil pressure through passages 65a and 66a. Retracting springs 67a and 68a hold pistons 58a and 59a in released position when oil pressure is exhausted. Clutch housing 57a is splined to shaft 37a and held in place by snap ring 69a. Clutch C1 is engaged by pressure through passage 70a which extends through shaft 37a, plate 41a and housing 42a to a valve box intended to be mounted on the housing but not shown in this drawing. Oil passages 65a and 66a are shown broken at the hub 77a of plate 41a and are intended to also connect to the valve box through additional passages in plate 41a. Gear set P4 consists of sun gear 56a, planets 71a, ring gear 72a which is fixed in end plate 73a by screw 74a, and carrier 75a which is integral with output shaft 76a.

Brake bands B1, B2 and B3, when contracted on drums 30a, 40a and 50a, respectively, hold sun gear 29a, ring gear 39a and sun gear 48a, and carrier 49a as reaction members. The brake bands are applied by hydraulic servos which are not shown as they do not form a part of this invention. Hydraulic pressure is obtained from a pump driven by the engine to deliver oil from the sump of housing 42a under pressure but this is not shown. In the diagrams, Figs. 1a to 8a, only two of the gear sets, P2 and P3, are shown and also brake bands B2 and B3 and clutches C1, C2 and C3. The brakes and clutches are shown released or applied, as required, for each speed ratio and for parking and neutral.

In Fig. 10a input shaft 80a drives sun gear 81a and also clutch C4 (shown engaged) which connects the input shaft to carrier 82a. Ring gear 83a is coupled to sun gear 88a by clutch C5 (shown released). Carrier 82a is connected to clutches C6 and C7 by shaft 84a. Ring gear 85a is integral with output shaft 86a.

Clutch C6 (shown engaged) couples shaft 84a to carrier 87a and clutch C7 (shown released) couples shaft 84a to output shaft 86a. Brake B4 (shown applied) holds sun gear 88a and brake B5 (shown released) holds carrier 87a.

Planet gears 89a and 90a are mounted on carriers 82a and 87a, respectively. Gear sets P5 and P6 correspond to sets P2 and P3 in Fig. 9a. Except for clutch C5 being added, Fig. 10a is the same as Figs. 1a to 8a. In Fig. 13a brake band B2 is shown on drum 40a. Also shown are ring gear 39a, sun gear 34a, planet gears 38a, carrier 36a, and power take-off shaft 23a. Servo 91a applies brake band B2 by means of springs 92a and 93a against piston 94a through rod 95a, lever 96a and strut 97a. Adjusting screw 98a prevents rotation of the brake band. Piston 94a is held on rod 95a by snap rings 99a. Oil pressure through opening 100a exerts pressure on piston 94a to release the brake. Servo 91a and cover plate 101a are attached to housing 42a by screws (not shown).

Lever 102a, also shown in Fig. 12a, has its shaft 103a journaled in servo 91a and cover plate 101a and lever 104a is fixed to shaft 103a by pin 105a. Cam 106a on end of rod 95a is biased by ball bearing 107a on the end of lever 104a so that when the lever moves the ball bearing from position 108a to 109a in Fig. 11a, the cam and rod move from the dotted position 110a, thus compressing the springs against cylinder head 112a, which is held in place by snap ring 113a. This releases brake band B2.

In Fig. 14a brake band B1 is applied on drum 30a by servo 114a. Oil pressure enters at opening 116a forcing piston 117a to compress retracting spring 118a and move rod 119a against the brake band end 120a. Servo cylinder head 133a is held in place by snap ring 134a.

A one-way clutch consists of sprag elements 33a between the hub 122a of sun gear 29a and the hub 123a of carrier 28a. The sprag elements 33a are biased to lock the sun gear 29a to the carrier 28a when the former attempts to overrun, but when the sun gear 29a is held by brake band B1 the one way clutch free wheels. Adjusting screw 115a receives the reaction force of brake band B1.

In Fig. 15a brake band B3 is applied to drum 50a by servo 124a. Springs 125a and 126a force piston 127a to the left, thus rocking lever 128a by means of piston rod 129a. Force is transmitted to the brake band end 130a by strut 131a. Adjusting screw 132a transmits the reaction force to housing 42a. Servo cylinder head 135a is held in place by snap ring 136a.

Bracket 137a is integral with cylinder head 135a and provides a support bearing for lever 128a. The servo is attached to housing 42a by screws, but are not shown. Oil pressure entering at opening 138a energizes piston 127a, thus compressing springs 125a and 126a and releasing the brake. Sealing ring 140a prevents oil leakage past the piston.

Operation of heavy duty transmission

Figure 7A:
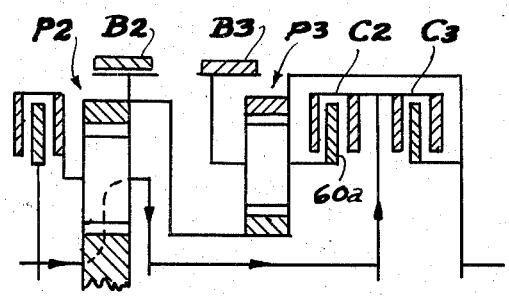
Fig. 7a shows the position of the brake bands in neutral.

Fig. 8a shows the bands B2 and B3 applied for Parking or Stop position. This locks gear set P3 and thus holds the vehicle wheels, because of the solid drive connection between ring gear 53a and the rear axle. Clutches C1, C2 and C3 are released which permits rotation of the engine driven members marked with arrows. In Fig. 7a, neutral position, only band B3 is applied. This allows the vehicle to coast or to be towed even though the middle plate 60a of clutch C2 is held by the band B3.

Figure 1A:
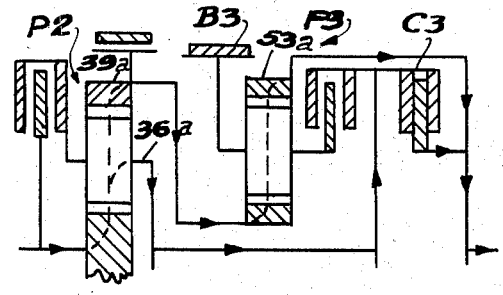

In 1st and 3rd speeds, shown in Fig. 1a, band B3 and clutch C3 are engaged and both carrier 36a and ring gear 39a are output members of gear set P2. The portion of torque emanating from carrier 36a is transmitted to gear set P4 in Fig. 9a by clutch C3 and the reverse torque of ring gear 39a passes through gear set P3 where it is converted back to forward torque at ring gear 53a and adds to that being transmitted to gear set P4 by clutch C3.

Figure 2A:
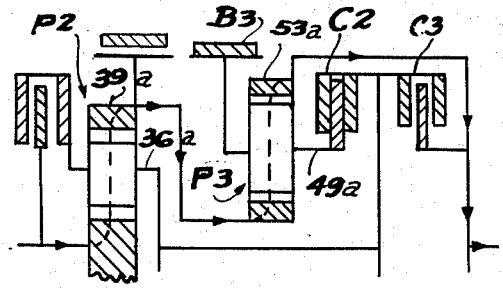

In 2nd and 4th speeds, shown in Fig. 2a, band B3 remains engaged as in low, but clutch C3 is released and clutch C2 engaged. Band B3 now holds both carriers 36a and 49a as reaction members and gear sets P2 and P3 are both reverse underdrives, but since they are in series, forward torque emerges from ring gear 53a.

Figure 3A:
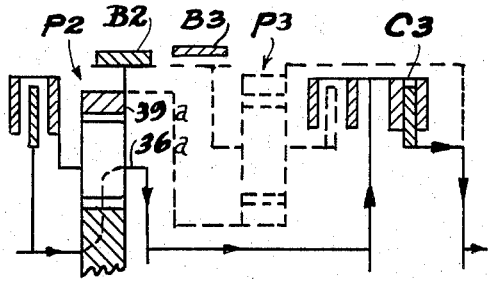

In 5th and 7th, shown in Fig. 3a, a shift is made back to clutch C3 and band B2 is engaged instead of band B3. Ring gear 39a is now the reaction member and the torque of carrier 36a is transmitted to gear set P4 by clutch C3, and gear set P3, shown in dotted lines, idles slowly.

Figure 4A:
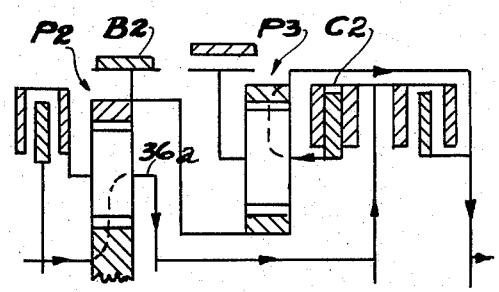

In 6th and 8th speeds, shown in Fig. 4a, gear set P2 produces the same multiplied torque as in 5th and 7th speeds, but, by engaging clutch C2 instead of C3, the torque of carrier 36a is overdriven through gear set P3 to produce a speed one step faster than 5th and 7th speeds.

Figure 5A:
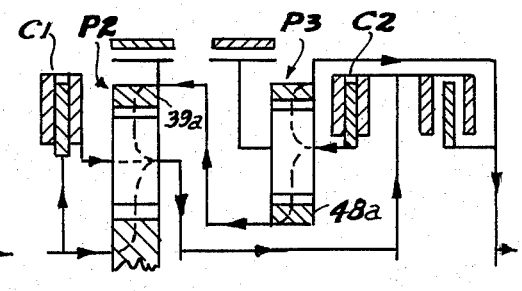

9th and 10th speeds are direct drive shown in Fig. 5a in which the gears are locked to rotate as a whole by clutches C1 and C2. Torque is transmitted through the gears and clutches as shown by the arrows. An optional lock-up for direct drive could be obtained by engaging clutches C2 and C3 with clutch C1 released.

Figure 6A:
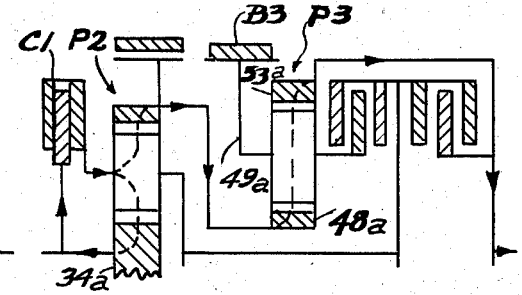

In reverse speed, shown in Fig. 6a, gear set P2 is locked up by clutch C1 and sun gear 48a becomes the input member of gear set P3. The torque of sun gear 34a is fed back through clutch C1 as shown by arrows. Band B3 holds carrier 49a which provides a reverse reduction at ring gear 53a.

Referring to Fig. 9a, when band B1 is released, one-way clutch 33a locks gear set P1 to provide direct drive to sun gear 34a of gear set P2 but when band B1 is applied to drum 30a, one-way clutch 33a unlocks and permits carrier 28a to overrun sun gear 29a and drive ring gear 32a at an overdriven speed. Thus the five speeds and reverse previously described can be obtained in either direct or overdrive range which results in a total of ten speeds forward and two in reverse.

Referring to gear set P4, since ring gear 72a is fixed in plate 73a, carrier 75a and output shaft 76a rotate at a slower R. P. M. than the input sun gear 56a, in all speeds. Gear set P4 is used in tractors having bevel final drive gears. In case of dual bull gear final drive, as in common practice, gear set P4 would be omitted.

If the number of teeth of the ring gear and sun gear of planetary gear set P2 are designated as R and S and those of set P3 as r and s, the formulae for the various reduction ratios obtained in these two gear sets alone are as follows:

| | |
|---|---|
| 1st | $\frac{R+S}{S} + \left(\frac{Rr}{Ss}\right)$ |
| 2nd | $\frac{Rr}{Ss}$ |
| 5th | $\frac{R+S}{S}$ |
| 6th | $\frac{(R+S) \times r}{S \times (r+s)}$ |
| 9th | Direct Drive |
| Low Reverse | $\frac{r}{s}$ |

These ratios would be multiplied by the reduction ratio of gear set P4 to obtain the over-all ratios.

If $R=65$, $S=37$, $r=68$, and $s=34$, and with a reduction ratio of 3.8:1 in set P4 and an overdrive ratio of .637 in set P1, the following over-all reduction ratios are obtained:

| | |
|---|---|
| (1) 38.0 | (3) 24.22 |
| (2) 26.6 | (4) 16.95 |
| (5) 11.4 | (7) 7.27 |
| (6) 8.85 | (8) 5.63 |
| (9) 3.80 | (10) 2.42 |
| Low Reverse 13.3 | High Reverse 8.46 |

In Fig. 10a, clutch C5, which is not present in Fig. 9a, is shown released, which disconnects ring gear 83a from sun gear 88a. Clutches C4 and C6 being engaged, lock up gear set P5 and carrier 87a to run at the same speed as shaft 80a. With brake B4 engaged as shown, sun gear 88a is held as a reaction member and ring gear 85a and output shaft 86a are overdriven.

With the same notation and number of teeth as specified in Figs. 1a to 8a and 9a, the formula for the 6th or overdrive ratio is $$\frac{r}{r+s}$$

and the over-all reduction ratios are 2.96 in low range and 1.88 in high range.

Referring to Fig. 13a, suitable valving directs oil pressure against piston 94a for neutral, 1st and 3rd, 2nd and 4th, and 9th and 10th and reverse speeds to release brake band B2. In the other speeds and in parking, springs 92a, 93a engage brake band B2 to hold ring gear 39a and sun gear 48a, but when oil pressure is not being supplied by the engine driven pump, the brake band B2 is applied automatically by loss of oil pressure. Consequently, lever 102a is provided to release brake band B2 to permit towing or pushing the tractor when the engine is dead. The notch at the top of cam 106a holds the band disengaged.

In Fig. 14a, piston 117a applies brake B1 for high range. Band B1 holds sun gear 29a in Fig. 9a as a reaction member for overdrive range. If it were free, the load at ring gear 32a would cause carrier 28a and planet gears 31a to rotate sun gear 29a faster than the input speed of carrier 28a. One-way clutch 33a is used to avoid this overrun of sun gear 29a by locking it to carrier 28a the instant band B1 is released while torque is being transmitted from the engine. Torque reversal due to coasting permits sun gear 29a to overrun when in the low range.

In Fig. 15a, oil pressure against piston 127a releases band B3 in 5th and 7th, 6th and 8th, and 9th and 10th speeds. In the other speeds and in neutral and parking, springs 125a and 126a engage the brake band and hold carrier 49a as a reaction member. It is not necessary to provide manual release of this brake band when towing the tractor as the release of brake band B2 permits ring gear 53a to rotate when the vehicle wheels begin to turn.

I claim:

1. A variable speed transmission for a self-propelled vehicle comprising a power input member, a load member, a first planetary gear set having an element driven by said power input member, a second planetary gear set having an element adapted to drive said load member, a selectively engageable clutch connection between second elements of each of said planetary sets, a selectively engageable clutch connection between third elements of each of said planetary sets, selectively engageable brake connections for holding said second and third elements of said second set stationary, and a selectively engageable clutch connection between an element of said first set and said output shaft.

2. A variable speed transmission for a self-propelled vehicle comprising a power input member, a load member, a first planetary gear set having an element driven by said power input member, a second planetary gear set having an element adapted to drive said load member, a selectively engageable clutch connection between second elements of each of said planetary sets, a selectively engageable clutch connection between third elements of each of said planetary sets, selectively engageable brake connections for holding said second and third elements of said second set stationary, and a selectively engageable clutch connection between a power input member and an element of said first planetary set other than said first-mentioned element.

3. A variable speed transmission for a self-propelled vehicle comprising a power input member, a load member, a first planetary gear set having an element driven by said power input member, a second planetary gear set having an element adapted to drive said load member, a selectively engageable clutch connection between second elements of each of said planetary sets, a selectively engageable clutch connection between third elements of each of said planetary sets, selectively engageable brake connections for holding said second and third elements of said second set stationary, a selectively engageable clutch connection between an element of said first set and said output shaft, and a selectively engageable clutch connection between a power input member and an element of said first set other than said first-mentioned element.

4. A variable speed transmission for a self-propelled vehicle comprising a power input member, a load member, a pair of axially aligned planetary gear sets interposed therebetween, each having sun, carrier and ring elements and a plurality of planet gears each meshing with said sun and ring elements, characterized by a gear train for transmitting power from said input to said load member in series through said planetary sets, and compounding the individual ratios thereof, wherein one of said sets has a braking connection for its carrier element, a power input connection for its ring element and a power output connection for its sun element, thus producing a reverse overdrive ratio, and wherein the other planetary set has a braking connection for its carrier element, a power input connection for its sun element and a power output connection for its ring element, producing a reverse reduction ratio, a power transmitting connection being provided between the power output element of one and the power input element of the other planetary set, thereby providing a net forward drive between said transmission input and load members.

5. A variable speed transmission for a self-propelled vehicle comprising a power input member, a load member, a pair of axially aligned planetary gear sets interposed therebetween, each having sun, carrier and ring elements and a plurality of planet gears each meshing with said sun and ring elements, characterized by a gear train for transmitting power from said input to said load member in series through said planetary sets compounding the individual ratios thereof, wherein one of said sets has a braking connection for its carrier element, a power input connection for its ring element and a power output connection for its sun element, producing a reverse overdrive ratio, and wherein the other planetary set has a braking connection for its carrier element, a power input connection for its sun element and a power output connection for its ring element, producing a reverse reduction ratio, said reverse reduction ratio exceeding the effective value of said reverse overdrive ratio, a power transmitting connection being provided between the power output element of one and the power input element of the other planetary set, thereby providing a net forward reduction ratio.

6. A variable speed transmission for a self-propelled vehicle comprising a power input member, a load member and a pair of axially aligned planetary gear sets interposed therebetween, each having sun, carrier, and ring elements, characterized by selectively operable power trains therein for transmitting power from said input to said load member through said planetary sets, for one of which trains means capable of transmitting drive are provided between said input member and one element of the first planetary set, between a second element of said first planetary set and said load member, between a third element of said first planetary set and one element of the second planetary set and between a second element of said second planetary set and said load member, and including brake means capable of holding a third element of said second planetary set stationary, whereby cumulative ratios of the individual sets may be employed to provide a split power train from each planetary set to said load member without full output torque passing through the working gears of either set, and wherein selectively releasable mechanism is included in said means between said first set element and said load member, and selectively engageable mechanism is provided for holding said last-mentioned first set element stationary, thereby providing upon respective release and engagement a series delivery through both planetary sets.

7. A variable speed transmission for a self-propelled vehicle comprising a power input member, a load member, a pair of axially aligned planetary gear sets interposed therebetween, each having sun, carrier and ring elements, characterized by selectively engageable gear trains for transmitting power from said input to said load member through said planetary sets, wherein for one of said trains driving connections are provided between said power input member and the ring element of the first planetary set, between the sun elements of the respective planetary sets, between the ring element of said second planetary set and said load member, and between the carrier element of said first planetary set and said load member, and a brake connection for holding the carrier element of said second planetary set stationary whereby cumulative reduction ratios of both sets are employed differentially in obtaining a low speed reduction drive, a clutch for rendering said first carrier element connection to said load member selectively releasable, and a selectively engageable brake connection for said first carrier element whereby a second gear train may be rendered effective, producing a reverse overdrive ratio in said first set and a reverse reduction ratio in said second set connected in series to provide a net forward ratio.

8. A variable speed transmission for a self-propelled vehicle comprising a power input member, a load member, a pair of axially aligned planetary gear sets interposed therebetween, each having sun, carrier, and ring elements, characterized by selectively engageable gear trains for transmitting power from said input to said load member in series through said planetary sets compounding the individual ratios thereof, wherein one of said gear trains is established by driving connections between said power input member and the ring element of the first planetary set, between the sun elements of the planetary sets, and between the ring element of the second planetary set and the load member, a releasable brake connection being provided for holding each of the carrier elements of both sets stationary thereby producing a reverse overdrive ratio in series with a reverse reduction ratio producing a net forward ratio, mechanism being provided for driving said second gear train, including a driving connection between said carrier elements, and a selectively engageable brake connection for holding each of said sun elements stationary, said brake connection for each of said carrier elements being released and said brake connection for each of said sun elements being applied to provide a forward reduction ratio in the first set, a forward overdrive ratio in the second set and an intermediate over-all ratio.

9. A variable speed transmission for a self-propelled vehicle comprising a power input member, a load member, a pair of axially aligned planetary gear sets interposed therebetween, each having sun, carrier and ring elements and a plurality of planet gears each meshing with said sun and ring elements, characterized by the ring element of the first planetary set being drivingly connected to said power input member, the ring element of the second planetary set being drivingly connected to said load member, a brake connection for simultaneously holding a second element of each of said planetary sets stationary, and a driving connection between the third elements of said planetary sets.

10. A variable speed transmission for a self-propelled vehicle comprising a power input member, a load member, a pair of axially aligned planetary gear sets interposed therebetween, each having sun, carrier and ring elements and a plurality of planet gears each meshing with said sun and ring elements, a driving connection between said power input member and the ring element of the first planetary set, a driving connection between the ring element of the second planetary set and said load member, a driving connection between the sun elements of said planetary sets, and a brake connection for holding each of the carrier elements of said planetary sets stationary.

11. A variable speed transmission for a self-propelled vehicle comprising a power input member, a load member, a pair of axially aligned planetary gear sets interposed therebetween, each having sun, carrier and ring elements, a driving connection between said power input member and the ring element of the first planetary gear set, a driving connection between the ring element of the second planetary gear set and said load member, a driving connection between the carrier elements of said planetary sets, a releasable clutch connection between said sun elements, and a single brake connection for simultaneously holding each of the sun elements of said planetary sets stationary.

12. A variable speed transmission for a self-propelled vehicle comprising a power input member, a load member, a pair of axially aligned planetary gear sets interposed therebetween, each having sun, carrier and ring elements and a plurality of planet gears each meshing with said sun and ring elements, a driving connection between said power input member and the ring element of the first planetary set, a driving connection between the ring element of the second planetary set and load member, a releasable driving connection between the sun elements of said planetary sets, and a releasable driving connection between the carrier elements of said planetary sets.

13. A variable speed transmission for a self-propelled vehicle comprising a power input member, a load member, a pair of axially aligned planetary gear sets interposed therebetween, each having sun, carrier and ring elements, a driving connection between said power input member and the carrier element of the first planetary set, a clutch connection between the respective carrier elements of said planetary sets, a driving connection between the ring element of the second planetary set and said load member, and a brake connection for holding the sun element of said second planetary set stationary.

14. A variable speed transmission for a self-propelled vehicle comprising a power input member, a load member, and a pair of axially aligned planetary gear sets interposed therebetween, characterized by a power train therein for transmitting power from said input to said load member through said planetary sets and wherein means capable of transmitting drive are provided between said input member and one element of the first planetary set, between a second element of said first planetary set and said load member, between a third element of said first planetary set and one element of the second planetary set, and between a second element of said second planetary set and said load member, and including brake means capable of holding a third element of said second planetary set stationary, whereby cumulative forward reduction ratios of both sets may be employed to provide a split power train from each planetary set to said load member without full output torque passing through the working gears of the other set, selectively engageable mechanism being included in said means between said first planetary gear set only and said load member.

15. A variable speed transmission for a self-propelled vehicle comprising a power input member, a load member, and a pair of axially aligned planetary gear sets interposed therebetween, characterized by a gear train for transmitting power from said input to said load member through said planetary sets and wherein driving connections are provided between said input member and one element of the first planetary set, between a second element of said first planetary set and said load member, between a third element of said first planetary set and one element of the second planetary set, and between a second element of said second planetary set and said load member, and wherein a brake connection is provided to hold a third element of said second planetary set stationary, whereby cumulative forward reduction ratios of both sets may be employed differentially in obtaining a reduction drive wherein parallel driving connections effect a partial delivery of torque from each planetary set to said load member without passing through the working gears of the other set, selectively engageable mechanism being provided to establish said driving connection between the elements of said first and second planetary gear sets.

16. A variable speed transmission for a self-propelled vehicle comprising a power input member, a load member, a pair of axially aligned planetary gear sets interposed therebetween, each having sun, carrier and ring elements and a plurality of planet gears each meshing with said sun and ring elements, a driving connection between said power input member and the ring element of the first planetary set, a driving connection between the ring element of the second planetary set and load member, a driving connection between the sun elements of said planetary sets, and a driving connection between the carrier elements of said planetary sets.

17. A variable speed transmission for a self-propelled vehicle comprising a power input member, a load member, a pair of axially aligned planetary gear sets interposed therebetween each having sun, carrier and ring elements and a plurality of planet gears each meshing with said sun and ring elements, a fluid coupling connection between said power input member and the ring element of the first planetary set, a driving connection between the ring element of the second planetary set and load member, a driving connection between the sun elements of said planetary sets, a driving connection between the carrier elements of said planetary sets, and a driving connection between the input element of said fluid coupling and the carrier of said first planetary set.

18. A variable speed transmission for a self-propelled vehicle comprising a power input member, a load member, a pair of axially aligned planetary sets interposed therebetween each having sun, carrier and ring elements, and a plurality of planet gears each meshing with said sun and ring elements, a fluid coupling driving connection between said power input member and the ring element of the first planetary set, a driving connection between the ring element of the second planetary set and load member, a releasable driving connection between the sun elements of said planetary sets, a releasable driving connection between the carrier elements of said planetary sets, and a releasable driving connection between the input element of said fluid coupling and the carrier of said first planetary set.

19. A variable speed transmission for a self-propelled vehicle comprising a power input member, a load member, a first planetary gear set having an element driven by said power input member, a second planetary gear set having an element adapted to drive said load member, selectively engageable clutch means between second elements of each of said planetary sets, a drive connection between third elements of each of said planetary sets, selectively engageable brake means for holding either said second or third elements of said second set stationary, and selectively engageable clutch means between an element of said first set and said output shaft.

20. A variable speed transmission for a self-propelled vehicle comprising an input member, a load member, two axially aligned planetary gear sets, each having sun, ring and carrier elements and at least one planet gear meshing with said sun and ring elements, comprising a power train therein for transmitting power from said input to said load member in series through said planetary sets compounding the individual ratios thereof, wherein each planetary set has means for holding its carrier element stationary, a power input connection for its sun element and a power output connection for its ring element, the individual planetary sets each producing a reverse reduction ratio but providing in series, a net forward reduction ratio between said input and load members.

21. A variable speed transmission for a self-propelled vehicle comprising a power input member, a load member, a pair of axially aligned planetary gear sets interposed therebetween, each having sun, carrier and ring elements and at least one planet gear meshing with said sun and ring elements, comprising selectively operable power trains therein for transmitting power from said input to said load member through said planetary sets, wherein, for one of said trains, means capable of transmitting drive are provided between the power input member and the sun element of the first planetary set, between the ring element of the first planetary set and the sun element of the second planetary set, between the ring element of the second planetary set and said load member and between the carrier element of the first planetary set and the load member, and brake means capable of holding the carrier of the second planetary set stationary, whereby cumulative reduction ratios of both sets are employed to provide a split power low speed reduction drive, said means including a clutch for releasing drive from the first carrier element to said load member, and selectively engageable means for holding said first carrier element stationary whereby a second power train may be rendered effective upon respective release and engagement, producing a reverse reduction ratio in each individual planetary set but providing, in series, a net forward reduction ratio.

22. A variable speed transmission for a self-propelled vehicle comprising a power input member, a load member, axially aligned first and second planetary gear sets interposed therebetween, each having sun, carrier and ring elements and at least one planet gear meshing with said sun and ring elements, comprising selectively operable power trains therein for transmitting power from said input to said load member in series through said planetary sets compounding the individual ratios thereof, wherein one of said power trains is established by means capable of transmitting drive between said power input member and the sun element of the first planetary set, between the ring element of the first planetary set and the sun element of the second planetary set, and between the ring element of the second planetary set and the load member, releasable means being provided for holding the carrier elements of both sets stationary thereby producing two reverse underdrive ratios but, in series, producing a net forward reduction ratio, and wherein a second of said power trains may be established by means for transmitting drive between said carrier elements, and selectively operable means for holding the ring element of the first planetary set and the sun element of the second planetary set stationary, whereby upon respective release and operation of said last three mentioned means said second power train will comprise a forward reduction ratio in the first planetary set, a forward overdrive ratio in the second planetary set and an intermediate over-all reduction ratio through both sets.

23. A variable speed transmission for a self-propelled vehicle comprising a power input member, a load member, a pair of axially aligned planetary gear sets interposed therebetween, each having sun, ring and carrier elements and a plurality of planet gears each meshing with both of said sun and ring elements, the sun element of the first planetary set being connected to the input member, the ring element of the second planetary set being drivingly connected to said load member, means for simultaneously holding a second element of each planetary set stationary, and means capable of transmitting drive between third elements of said planetary sets.

24. A variable speed transmission for a self-propelled vehicle comprising a power input member, a load member, a pair of axially aligned planetary gear sets interposed therebetween, each having sun, carrier and ring elements and at least one planet gear meshing with both sun and ring elements, a driving connection between said power input member and the sun element of the first planetary gear set, a driving connection between the ring element of the second planetary set and said load member, a driving connection between the ring element of said first planetary set and the sun element of said second gear set, and means for holding each of the carrier elements of said planetary sets stationary.

25. A variable speed transmission for a self-propelled vehicle comprising a power input member, a load member, a pair of axially aligned planetary gear sets interposed therebetween, each having sun, carrier and ring elements and a plurality of planet gears each meshing with said sun and ring elements, a driving connection between said power input member and the sun element of the first planetary set, a driving connection between the ring element of the second planetary set and said load member, a clutch connection between the carrier elements of said planetary sets, and means for simultaneously holding the ring element of said first planetary set and the sun element of the second set stationary.

26. A variable speed transmission for a self-propelled vehicle comprising a power input member, a load member, a pair of axially aligned planetary gear sets interposed therebetween, each having sun, carrier and ring elements and a plurality of planet gears each meshing with both of said sun and ring elements, a driving connection between said power input member and the sun element of the first planetary set, a driving connection between the ring element of the second planetary set and the load member, a driving connection between the ring element of the first planetary set, and the sun element of the second planetary set, means for releasably connecting the carrier elements of said planetary sets, and means for releasably holding one or both of said carriers stationary depending on whether said last means is released or operative.

27. A variable speed transmission for a self-propelled vehicle comprising a power input member, a load member, a pair of axially aligned planetary gear sets interposed therebetween, each having sun, carrier and ring elements and at least one planet gear meshing with said sun and ring elements, a driving connection between the power input member and the sun element of the first planetary set, a driving connection between the ring element of the second planetary set and the load member, a direct driving connection between the ring element of the first planetary set and the sun element of the second planetary set, a releasable brake means for holding said last ring and sun element stationary and a releasable connection between the carrier elements of said planetary sets.

28. A variable speed transmission for a self-propelled vehicle comprising an input member, a load member, first and second axially aligned planetary gear sets each having sun, ring and carrier elements and at least one planet gear meshing with said sun and ring elements, the input member being connected to a first member of said first gear set, the load member being connected to a first member of the second gear set, a driving connection between second members of each gear set, first clutch means between third members of each gear set, second clutch means between two members of the first gear set, third clutch means between said third element of first gear set and the load member, and brake means for holding said third elements of each gear set as reaction members when said second and third clutch means are released and said first clutch means is engaged, to provide a gear reduction drive between said input and load members, and wherein a second gear reduction drive is established between the input and load members when the said brake means is applied, said first and second clutch means are released and said third clutch means is engaged, and wherein a third gear reduction drive is established between the input and load members when said brake means is applied and said first and third clutch means are released and said second clutch means is engaged.

29. A variable speed transmission for a self-propelled vehicle comprising a power input member, a load member and a pair of axially aligned planetary gear sets interposed therebetween, each having sun, carrier, and ring elements, characterized by selectively operable power trains therein for transmitting power from said input to said load member through said planetary sets, for one of which trains means capable of transmitting drive are provided between said input member and one element of the first planetary set, between a second element of said first planetary set and said load member, between a third element of said first planetary set and one element of the second planetary set and between a second element of said second planetary set and said load member, and wherein a brake means capable of holding a third element of said second planetary set stationary, whereby cumulative ratios of the individual sets may be employed to provide a split power train from each planetary set to said load member without full output torque passing through the working gears of either set, and wherein selectively releasable mechanism is included in said means between said first set element and said load member.

30. A variable speed transmission for a self-propelled vehicle comprising a power input member, a load member, and a pair of axially aligned planetary gear sets interposed therebetween, characterized by a power train therein for transmitting power from said input to said load member through said planetary sets and wherein means capable of transmitting drive are provided between said input member and one element of the first planetary set, between a second element of said first planetary set and said load member, between a third element of said first planetary set and one element of the second planetary set, and between a second element of said second planetary set and said load member, and wherein a brake means capable of holding a third element of said second planetary set stationary, whereby cumulative forward reduction ratios of both sets may be employed to provide a split power train from each planetary set to said load member without full output torque passing through the working gears of the other set.

31. A variable speed transmission for a self-propelled vehicle comprising a power input member, a load member and a pair of axially aligned planetary gear sets interposed therebetween, each having sun, carrier, and ring elements, characterized by selectively operable power trains therein for transmitting power from said input to said load member through said planetary sets, for one of which trains means capable of transmitting drive are provided between said input member and the sun element of the first planetary set, between a second element of said first planetary set and said load member, between a third element of said first planetary set and one element of the second planetary set and between a second element of said second planetary set and said load member, and wherein a brake means capable of holding a third element of said second planetary set stationary, whereby cumulative ratios of the individual sets may be employed to provide a split power train from each planetary set to said load member without full output torque passing through the working gears of either set, and wherein selectively releasable mechanism is included in said means between said first set element and said load member.

32. A variable speed transmission for a self-propelled vehicle comprising a power input member, a load member, and a pair of axially aligned planetary gear sets interposed therebetween, characterized by a gear train for transmitting power from said input to said load member through said planetary sets and wherein means capable of transmitting drive are provided between said input member and the sun element of the first planetary set, between a second element of said first planetary set and said load member, between a third element of said first planetary set and one element of the second planetary set, and between a second element of said second planetary set and said load member, and wherein a brake means capable of holding a third element of said second planetary set stationary, whereby cumulative forward reduction ratios of both sets may be employed to provide a split power train from each planetary set to said load member without full output torque passing through the working gears of the other set.

References Cited in the file of this patent

UNITED STATES PATENTS

| | | |
|---|---|---|
| 312,146 | Merritt | Feb. 10, 1885 |
| 2,466,320 | Lawrence | Apr. 5, 1949 |
| 2,546,378 | Winther | Mar. 27, 1951 |
| 2,586,617 | Danly | Feb. 19, 1952 |
| 2,656,015 | Lapsley | Oct. 20, 1953 |
| 2,703,155 | Simpson | Mar. 1, 1955 |

UNITED STATES PATENT OFFICE
CERTIFICATE OF CORRECTION

February 17, 1959

Patent No. 2,873,621

Howard W. Simpson

It is hereby certified that error appears in the printed specification of the above numbered patent requiring correction and that the said Letters Patent should read as corrected below.

Column 15, line 7, for "the other" read -- either --; column 18, lines 43 and 65, column 19, lines 11, and column 20, line 8, for "wherein a" read -- including --; column 19, line 23, for "gear" read -- power --; same line, after "train" insert -- therein --.

Signed and sealed this 23rd day of June 1959.

(SEAL)
Attest:

KARL H. AXLINE
Attesting Officer

ROBERT C. WATSON
Commissioner of Patents